United States Patent [19]
Shrader et al.

[11] Patent Number: 6,026,440
[45] Date of Patent: *Feb. 15, 2000

[54] WEB SERVER ACCOUNT MANAGER PLUG-IN FOR MONITORING RESOURCES

[75] Inventors: Theodore Jack London Shrader, Cedar Park; Michael Bradford Ault, Austin; Ernst Robert Plassmann, Pflugerville; Bruce Arland Rich, Round Rock; Mickella Ann Rosiles; Shaw-Ben Shi, both of Austin, all of Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/789,697

[22] Filed: Jan. 27, 1997

[51] Int. Cl.[7] ..................................................... H04L 12/26
[52] U.S. Cl. .......................... 709/224; 709/203; 709/229; 709/302
[58] Field of Search .......................... 395/200.54, 200.36, 395/200.53, 200.59; 707/201; 902/4; 709/223, 224, 203, 229, 302

[56] References Cited

U.S. PATENT DOCUMENTS

| | | | |
|---|---|---|---|
| 5,063,523 | 11/1991 | Vrenjak | 709/224 |
| 5,109,486 | 4/1992 | Seymour | 709/224 |
| 5,210,795 | 5/1993 | Lipner et al. | 380/23 |
| 5,434,994 | 7/1995 | Shaheen et al. | 707/201 |
| 5,530,852 | 6/1996 | Meske, Jr. et al. | 709/206 |
| 5,550,968 | 8/1996 | Miller et al. | 395/332 |
| 5,555,377 | 9/1996 | Christenensen et al. | 709/224 |
| 5,560,008 | 9/1996 | Johnson et al. | 709/229 |
| 5,594,227 | 1/1997 | Deo | 902/4 |
| 5,621,892 | 4/1997 | Cook | 709/224 |
| 5,634,008 | 5/1997 | Gaffaney et al. | 709/224 |
| 5,696,701 | 12/1997 | Burgess et al. | 709/224 |
| 5,729,472 | 3/1998 | Seiffert et al. | 709/224 |
| 5,751,964 | 5/1998 | Ordanic et al. | 709/224 |

OTHER PUBLICATIONS

Michael Moeller, Aventail and Checkpoint ignite firewall security, PC Week, p. 18, Nov. 1996.

Author unknown, Checkpoint Software Unveils Open Security Platform Strategy, Business Wire, DIALOG 00698301, 3 pages, Nov. 1996.

*Primary Examiner*—Zarni Maung
*Assistant Examiner*—Patrice Winder
*Attorney, Agent, or Firm*—Jeffrey S. LaBaw; David H. Judson

[57] ABSTRACT

An account manager plug-in for a Web server having an application programming interface (API). The plug-in is preferably a computer program product comprising a set of instructions (program code) encoded on a computer-readable substrate. This plug-in includes program code for establishing a set of one or more monitored resources (e.g., UrlCounter, ByteCounter, PageCounter and FailedLoginCounter) and for defining a threshold rule for at least one of the set of monitored resources. As Web transactions occur at the Web server, the account manager is responsive to a monitored resource exceeding a condition of a threshold rule for triggering one of a set of threshold actions. The set of threshold actions, for example, include clearing a record counter, running a given program, sending an e-mail note and disabling or enabling a user account.

20 Claims, 2 Drawing Sheets

WEB SERVER ACCOUNT MANAGER PLUG-IN FOR MONITORING RESOURCES

TECHNICAL FIELD

The present invention relates generally to administration and management of Web server transactions.

BACKGROUND OF THE INVENTION

The World Wide Web of the Internet is the most successful distributed application in the history of computing. In the Web environment, client machines effect transactions to Web servers use the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator) at a client machine involves specification of a link via the URL. In response, the client makes a request to the server identified in the link and receives in return a document formatted according to HTML.

The Web server is usually a standalone file server that services various Web document requests. Because the server is self-contained, web site administration is cumbersome because access control must be individualized for each device. Although conventional Web servers have some basic administration tools, such as the ability to log transactions and run reports, these tools are not flexible enough to provide the administrator with sufficient information in order to "fine tune" the site. Thus, for example, an administrator certainly will want to know whether a particular Web page was highly active so that the page could be put on a faster server for better site performance. Currently-existing administration tools do not afford sufficient flexibility to manage the server at such a fine level.

The burdens on Internet administrators will grow even more rapidly in volume and complexity as they attempt to manage Distributed File System (DFS) access through their Web servers. DFS is part of a known distributed computing environment, called DCE, that has been implemented using software available from the Open Systems Foundation (OSF). DFS provides many advantages over a standalone file server, such as higher availability of data and resources, the ability to share information throughout a very large-scale system, and protection of information by the robust DCE security mechanism. In particular, DFS makes files highly available through replication, making it possible to access a copy of a file if one of the machines where the file is located goes down. DFS also brings together all of the files stored in various file systems in a global namespace. Multiple servers can export their file system to this namespace. All DFS users, in the meantime, share this namespace, making all DFS files readily available from any DFS client machine.

It would be highly desirable to extend the functionality of existing standalone Web servers in the enterprise environment to take advantage of the scalability, file availability and security features of DFS (or other similar distributed file systems). Before this goal can be achieved, however, it is necessary to provide new techniques and solutions for administration and management of Web server transactions.

This is the problem addressed by the teachings of the present invention.

BRIEF SUMMARY OF THE INVENTION

It is thus a primary object of the invention to provide for the efficient administration and management of Web server transactions.

It is a more specific object to administer and manage Distributed File Systems (DFS) Web server transactions.

Yet another object of the invention is to implement an administration and management system as a callable module or plug-in to the Web server.

Still another object of the invention is to store information about a set of designated monitored resources. These resources include, for example, the number of times a URL location is accessed (UrlCounter), the number of bytes a user has accessed (ByteCounter), the number of operations a user has initiated (PageCounter), and a number of times a user has a failed login (FailedLoginCounter).

Another more specific object of the invention is to monitor Web specific server resources and allow administrators to define triggerable actions that should occur when counter values for these resources meet certain criteria. The administrator can, for example, create a threshold rule that sends an e-mail note or runs a paging program when more than a predetermined number of login attempts take place.

It is a further more general object of the invention to simplify the administration and management of Web servers.

It is still another general object to reduce the cost of Internet server administration through the use of a consistent, simplistic and portable interface that enables administrators to easily manage transactions on Web servers.

Another object of the invention is to provide a novel administration and management plug-in for a server connected to the Internet, to an Intranet, or to a virtual private network.

These and other objects are achieved by providing an account manager plug-in for a Web server having an application programming interface (API). The plug-in is preferably a computer program product comprising a set of instructions (program code) encoded on a computer-readable substrate. This plug-in includes program code for establishing a set of one or more monitored resources (e.g., UrlCounter, ByteCounter, PageCounter and FailedLoginCounter) and for defining a threshold rule for at least one of the set of monitored resources. As Web transactions occur at the Web server, the account manager is responsive to a monitored resource exceeding a condition of a threshold rule for triggering one of a set of threshold actions. The set of threshold actions, for example, include clearing a record counter, running a given program or sending an e-mail note.

Preferably, threshold rules are stored in a threshold definition file, and each monitored resource includes a database in which the information about the resource is stored in a given format. Generally, the condition of the threshold rule is evaluated after a database record (for the monitored resource) is updated.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
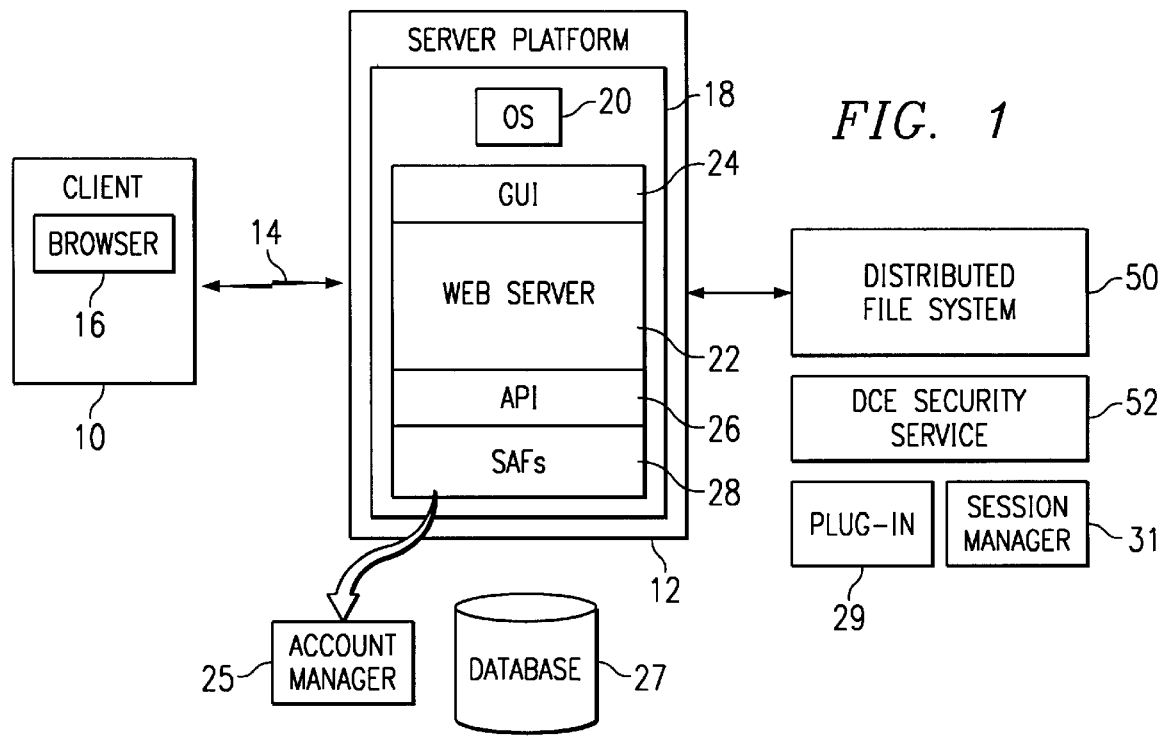
FIG. 1 is a representative system in which the account manager plug-in and of the present invention is implemented.

A representative system in which the present invention is implemented is illustrated in FIG. 1. A client machine 10 is connected to a Web server platform 12 via a communication channel 14. For illustrative purposes, channel 14 is the Internet, an Intranet or other known connection. In the case of the Internet, Web server platform 12 is one of a plurality of servers which are accessible by clients, one of which is illustrated by machine 10. A client machine includes a browser 16, which is a known software tool used to access the servers of the network. Representative browsers include, among others, Netscape Navigator (all versions), Microsoft Internet Explorer (all versions) or the like, each of which are "off-the-shelf" or downloadable software programs. The Web server platform (sometimes referred to as a "Web" site) supports files in the form of hypertext documents and objects. In the Internet paradigm, a network path to a server is identified by a so-called Uniform Resource Locator (URL). The World Wide Web is the Internet's multimedia information retrieval system. In particular, it is a collection of servers of the Internet that use the Hypertext Transfer Protocol (HTTP), which provides users access to files using Hypertext Markup Language (HTML).

A representative Web Server platform 12 comprises an IBM RISC System/6000 computer 18 (a reduced instruction set of so-called RISC-based workstation) running the AIX (Advanced Interactive Executive Version 4.1 and above) Operating System 20 and a Web server program 22, such as Netscape Enterprise Server Version 2.0, that supports interface extensions The platform 12 also includes a graphical user interface (GUI) 24 for management and administration. The various models of the RISC-based computers are described in many publications of the IBM Corporation, for example, *RISC System/6000, 7013 and 7016 POWERstation and POWERserver Hardware Technical Reference*, Order No. SA23-2644-00. AIX OS is described in *AIX Operating System Technical Reference*, published by IBM Corporation, First Edition (November 1985), and other publications. While the above platform is useful, any other suitable hardware/operating system/web server combinations may be used.

Figure 2:
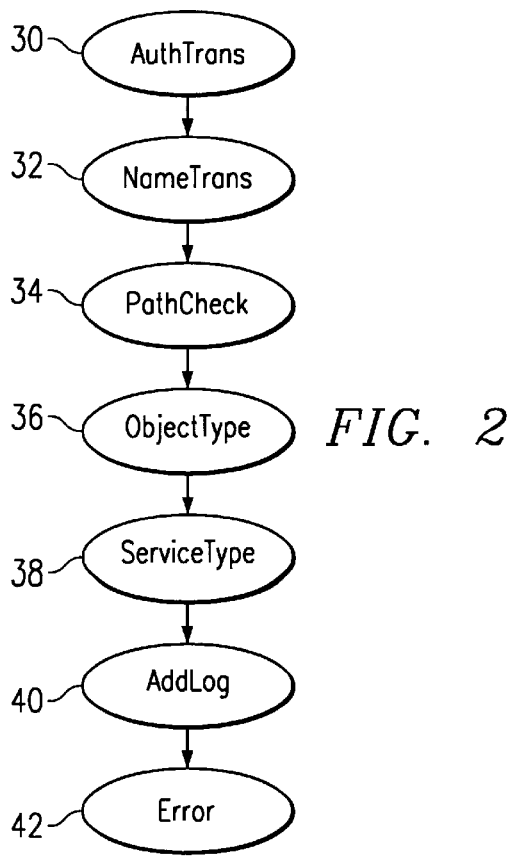
FIG. 2 is a flowchart of the server side operations during a conventional Web transaction in response to receipt of a request from a client machine.

The Web Server accepts a client request and returns a response. The operation of the server is governed by a number of server application functions (SAFs) 28, each of which is configured to execute in a certain step of a sequence. This sequence, illustrated in FIG. 2, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.) for the given document is identified. At step 38, called Service (Service), the Web server routine selects an internal server function to send the result back to the client via a normal server-service routine. The particular function selected depends on the nature of the request. At step 40, called Add Log (AddLog), information about the transaction is recorded. At step 42, called Error, the server responds to the client when it encounters an error. Further details of these operations may be found in the Netscape *Web Server Programmer's Guide*, Chapter 5, which is incorporated herein by reference.

Thus, the Web server 18 includes a known set of server application functions (SAFs). These functions take the client's request and other configuration data of the server as input and return a response to the server as output. Referring back to FIG. 1, the Web server 12 also includes an Application Programming Interface (API) 26 that provides extensions to enable application developers to extend and/or customize the core functionality thereof (namely, the SAFs) through software programs commonly referred to as "plug-ins." The present invention makes use of the server API 26 to provide for a plug-in account manager 25 that facilitates administration and management of server transactions. The account manager 25 has one or more associated databases 27.

Referring now back to FIG. 1, the client machine 10 may access, browse and retrieve documents located in the Web server or in a distributed file system 50 in which the Web server is connected. One such file system 50 is Distributed File Services (DFS), which is a known distributed file system implemented in a networked environment called the Distributed Computing Environment (DCE). DCE has been implemented using software available from the Open Systems Foundation (OSF). DCE DFS 50 provides data sharing services by making use of remote procedure calls (RPC's) for naming, and a DCE Security Service 52 for authentication services. DFS 50 interfaces to the DCE Security Service 52 via a plug-in 29 and the session manager process 31, as described in copending application Ser. No. 08/790,042 now U.S. Pat. No. 5,918,228, and assigned to the assignee of this application.

Figure 3:
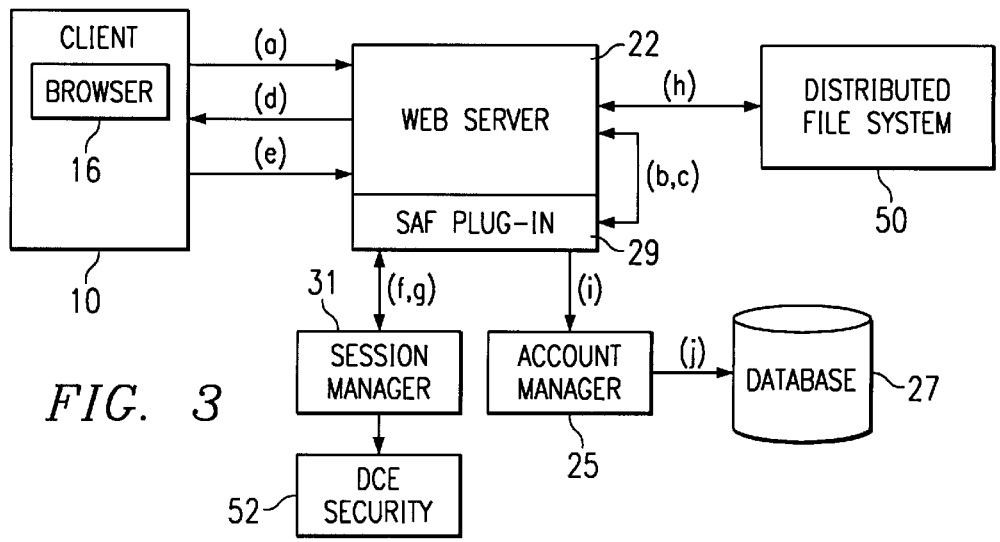
FIG. 3 is a process flow diagram illustrating a DFS Web transaction.

The control flow associated with a Web transaction to DFS 50 is illustrated in the process flow diagram of FIG. 3. Session manager 31 starts up upon initialization of the Web server and is preferably run by the workstation computer 18. When the client 10 (through the browser 16) requests a DFS document (step a), the Web server 18 invokes a server path check (using the SAF plug-in 29)(step b). The PathCheck checks with the session manager 31 to determine whether the user has appropriate DCE credentials. If not (step c), the SAF plug-in 29 will return an error message (e.g., "401; Unauthorized") to the browser 16 (step d) and prompt the user for user id and password. After getting the user id and password from the user (step e), the SAF plug-in invokes the session manager 31 (step f) to obtain the DCE credential for the user. Session manager 31 returns the DCE credential to the Web server (step g). The server then uses this user credential to represent the user to retrieve documents stored in DFS 50 (step h). After retrieving the documents, the account manager 25 is invoked (step i) to save appropriate usage information into its database 27 (step j).

Although the account manager 25 is illustrated as being used in the DFS Web server environment of FIG. 3, it should also be appreciated that it may be used with the Web server operating in a standalone mode. Indeed, the following description of the preferred features of the account manager 25 are not limited for use in any particular operating environment or with any particular type of Web server.

Figure 4:
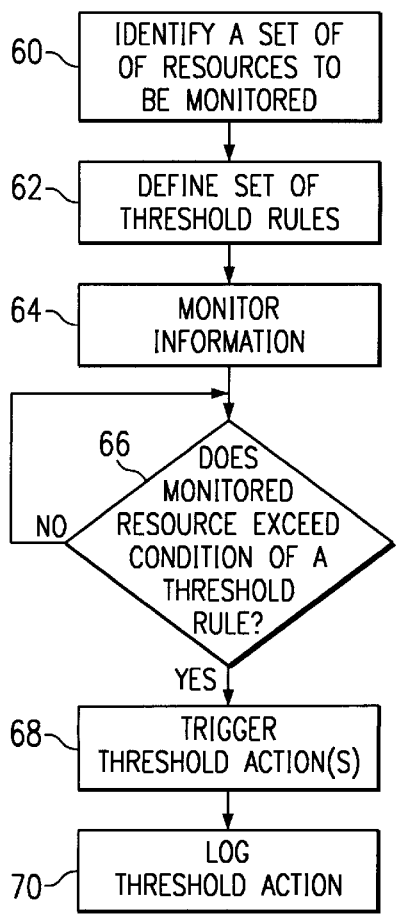
FIG. 4 is a flowchart illustrating the basic administration and management features of the account manager invention.

Preferably, the account manager 25 is implemented as a callable module or plug-in (through the API) of the Web server. According to the invention, the account manager includes support for enabling the administrator to designate a set of one or more "monitored resources", to define threshold rules for the monitored resources, and to effect a set of threshold actions that take place when monitored resources satisfy the conditions of the threshold rules. A simplified flowchart of the preferred operation of the account manager is seen in FIG. 4.

At step 60, a method of managing Web server transactions begins by having the server administrator identify a set of one or more resources that are desired to be monitored by the account manager. At step 62, the administrator defines a set of threshold rules used to create thresholds against which the resources can be tested. Thus, for example, the following monitored resources can be stored and have thresholds defined against them:

Number of times a URL location is accessed. (UrlCounter)

This resource provides the administrator with an indication of the popularity of certain documents, namely, the frequency that they have been accessed.

Number of bytes a user has accessed. (ByteCounter)

This resource provides the administrator with the raw volume of data retrieved by a particular user.

Number of operations a user has initiated. (PageCounter)

This resource provides the administrator with transaction information for a particular user. Transaction actions include getting the contents of a web page and individual images on the page.

Number of times a user has a failed login. (FailedLoginCounter)

This resource provides the administrator with the number of invalid login attempts to DCE.

The counters associated with each record can be reset manually by the administrator or automatically at a given time by the account manager as specified in a configuration file. In the embodiment of FIG. 3, all monitored resources require name and value pairs be passed to the account manager 25 to indicate that the particular request has been serviced by the session manager 31.

Returning now to FIG. 4, it is now assumed that users are "browsing" the Internet and accessing documents in the Web server and/or the distributed file system 50. Such activity creates information on the set of one or more monitored resources, and this is represented by step 64 in the flowchart of FIG. 3. At step 66, a test is made to determine whether a monitored resource matches a condition of a threshold rule defined for that resource. If the outcome of the test at step 66 is negative, the routine recycles. If, however, the outcome of the test at step 66 is positive, indicating the monitored resource counter matches the threshold established by the rule, one of a set of threshold "actions" may be triggered in the account manager. This is represented as step 68. The set of threshold actions include clearing a record counter (of the monitored resource), running a given program, sending an e-mail note, or some other admin or management action such as disabling or enabling a DCE user account. As seen in FIG. 4, the steps are illustrated with respect to a single threshold rule/monitored resource, but it should be appreciated that the same operation takes place with respect to each rule/resource. Preferably, step 66 (checking whether the threshold is matched) is carried out after a database record (for the monitored resource) is updated or stored. This operation, however, can be overridden by the administrator. In particular, if the administrator indicates that a resource should not be monitored via the configuration file, the threshold rules for monitored resource will not be checked. At step 70, the particular threshold action triggered at step 68 may be logged. This completes the basic processing of the account manager.

After triggering and logging a threshold, the cycle continues with the account manager monitoring information for each Web transaction. Note that the administrator can specify that all matching threshold rules be triggered or just the first match.

The detailed operation of the account manager is now described. As noted above, the account manager as implemented (in FIG. 3) focuses on monitoring DFS Web specific or related resources. Resources are currently defined as the name and value pairs passed into the parameter block of the account manager server plug-in. The account manager need not attempt to monitor all the resources that are available through the Web server, which will typically have a number of administrative functions already built in to monitor its resources.

Preferably, the account manager stores information on each monitored resource in column format. For each monitored resource database, the column format may be as follows:

resource-value counter last-reset-timestamp

The resource-value is a string. The counter value will be zero or greater. The last-reset-timestamp is in a form similar to: 843056349 Wednesday, 18-Sep-96 09:19:09 CDT.

As noted above, one of the features of the account manager is that the administrator can define thresholds based on monitored resources. The threshold rules are stored in a threshold definition file. The fully-qualified file name to the threshold file is stored in the server configuration file. The layout of the threshold file is similar to an INI file format. The threshold file contains one or more threshold rules.

Threshold Rule Format

The format of each threshold rule is defined as follows:

```
•[threshold-rule-title]
trigger = {urlcounter | bytecounter | pagecounter | failedlogincounter }
triggercomparison = {> | < | = | >= | <= | <>}
triggervalue = triggervalue-value
urlpath = {urlpath-value1 [... urlpath-valueN]}
dceusername = {dceusername-value1 •... dceusername-valueN]}
action = {none | clear | program | note }
actionparameter = actionparameter-value
logfile = logfile-value
```

The title of the threshold rule is stored between brackets and indicates the beginning of a new threshold rule definition.

The threshold keywords and values are defined as follows:

trigger-keyword

This keyword allows administrators to define a threshold rule against a resource monitored by the account manager. The available trigger values match each of the monitored resource counters on a one-to-one basis. The administrator must define the monitoring of the resource corresponding to the trigger-value in the server configuration file for a threshold rule with the monitored resource to be triggered. If the resource is not monitored and a threshold rule contains the trigger keyword and a value corresponding to the unmonitored resource, the threshold rule will be skipped. For example, if the trigger-value is PageCounter for a threshold rule and the set of PageCounter keywords are not defined in the configuration file, the threshold rule will be skipped.

This keyword and its accompanying value are required for a threshold rule to be valid. Invalid threshold rules are ignored.

trigger-value

Valid trigger-values are: {urlcounter|bytecounter|pagecounter|failedlogincounter}.

If a trigger-value is not specified or does not match one of the valid values, the threshold rule is invalid. Invalid threshold rules are ignored.

triggercomparison-keyword

This keyword allows administrators to compare a monitored resource counter value against an integer value defined as the triggervalue-value. The triggercomparison-value matches each of the arithmetic comparison operators.

This keyword and its accompanying value are required for a threshold rule to be valid. Invalid threshold rules are ignored.

triggercomparison-value

Valid triggercomparison-values are: {>|<|=|>=|<=|<>}

If a triggercomparison-value is not specified or does not match one of the valid values, the threshold rule is invalid. Invalid threshold rules are ignored.

triggervalue-keyword

This keyword allows administrators to specify an integer number for a monitored resource counter to be compared against. The triggervalue-keyword value is specified as an integer number.

This keyword and its accompanying value are required for a threshold rule to be valid. Invalid threshold rules are ignored.

triggervalue-value

A triggervalue-value is an integer between 0 and the maximum integer value defined for the target platform. If a triggervalue-value is not specified or if it is not an integer, the value defaults to 0. If the specified value is greater than the maximum allowed value for the target platform, the value will be defaulted to the maximum value.

urlpath-keyword

This keyword allows administrators to compare the url path for a transaction against one or more url paths defined in the urlpath-value.

This keyword is optional and can be defined in addition to the trigger keywords. If this keyword is not specified as part of a threshold rule, the rule considers all url paths to match.

urlpath-value(s)

This value allows administrators to define one or more url paths that a transaction passing the trigger comparison should match against. If more than one url path is specified, the threshold rule will match against any of them. If more than one url path is specified, each urlpath-value must be separated by a blank space. Tab characters in the value will be changed into blank spaces. Duplicate url paths in the value will be ignored. Each urlpath-value can contain a regular expression as defined by the regcomp expression rules.

If any urlpath-value contains an invalid regular expression, the entire threshold rule is invalid. Invalid threshold rules are ignored.

dceusername-keyword

This keyword allows administrators to compare the DCE user name for a transaction against one or more DCE user names defined in the dceusername-value.

This keyword is optional and can be defined in addition to the trigger keywords. If this keyword is not specified as part of a threshold rule, the rule considers all DCE user names to match.

dceusername-value(s)

This value allows administrators to define one or more DCE user names that a transaction passing the trigger comparison should match against. If more than one DCE user name is specified, the threshold rule will match against any of them. If more than one DCE user name is specified, each dceusername-value must be separated by a blank space. Tab characters in the value will be changed into blank spaces. Duplicate DCE user names in the value will be ignored. Each dceusername-value can contain a regular expression as defined by the regcomp expression rules.

If any dceusername-value contains an invalid regular expression, the entire threshold rule is invalid. Invalid threshold rules are ignored.

action-keyword

This keyword allows administrators to execute an action if the trigger comparison is true and if any of the urlpath or dceusername comparisons matched.

If this keyword is not specified, the action defaults to none.

action-value

Valid action-values are {none|clear|program|note}. The following table explains the operation performed for each action.

TABLE 1

Action Values

| Action-Value | Operation |
| --- | --- |
| none | Performs no action. Specified only when the administrator wants to log a threshold, but not take an action on it. |
| clear | Resets the counter matching the triggered monitored resource to zero. This action will not trigger any additional threshold rules. |
| program | Spawns a program asynchronously. The output or return code from the program are not saved by the account manager. The program is run under the same uid and gid as the web server. |
| note | Sends an e-mail note. |

If an action value is not specified or does not match one of the valid values, the threshold rule is invalid. Invalid threshold rules are ignored.

actionparameter-keyword

This keyword allows the administrator to specify the object or address to perform the action on.

If the action-value is "program" or "note", this keyword and its accompanying value are required for a threshold rule to be valid. Invalid threshold rules are ignored.

If an action-value is "none" or "clear", this keyword and its accompanying value are ignored if they were specified in the threshold rule.

actionparameter-value

The following table explains the parameters required for each action.

TABLE 2

Action Parameter Values

| Action-Value | Action Parameter-value |
|---|---|
| none | N/A. If a value is specified, it is skipped. |
| clear | NIA. If a value is specified, it is skipped. |
| program | Fully-qualified program name. If needed by the program, parameters to the program should follow the first blank space after the fully-qualified program name. |
| note | E-mail address. If desired by the administrator, information to append to the note should follow the first blank space after the e-mail address. |

Tab characters in the value will be changed into blank spaces.

If the action keyword has a value of "program" or "note" and if the actionparameter-value is not specified, the threshold rule is invalid. Invalid threshold rules are ignored.

logfile-keyword

Allows the administrator to specify a file name in which to log a record when a threshold rule has been triggered.

This keyword is optional. If this keyword is not specified as part of a threshold rule, no log record will be written.

logfile-value

The logfile value requires a fully-qualified file name. The directory must already exist and be readable and writable by the uid and gid under which the web server is running. If specified and the threshold rule matches, a log record for the threshold will be written to the file. The log record has a predefined format. Anything after the file name will be appended to the end of the record (e.g., a miscellaneous column). Tab characters in the value will be changed into blank spaces.

Additional Threshold File Format Rules

All string values in a threshold rule are case sensitive. The following string values can be defined in a threshold rule:
urlpath-value(s)
dceusername-value(s)
actionparameter-value
logfile-value The following value must be specified as an integer between 0 and the maximum integer value defined for the target platform:
triggervalue-value The following values allow regular expressions, as defined by the regcomp expression rules:
urlpath-value(s)
dceusername-value(s)

Keywords in the threshold file are not case sensitive. The keywords supported are:
trigger
triggercomparison
triggervalue
urlpath
dceusername
action
actionparameter
logfile As trigger-values, the following keywords are not case sensitive:
urlcounter
bytecounter
pagecounter
failedlogincounter As action-values, the following keywords are not case sensitive:
none
clear
program
note The following describes one particular exemplary embodiment of the invention be should not be construed as limiting.

Each keyword may be preceded by zero to many blank characters. It can be followed by zero to many blank characters. An equal sign comes afterwards followed by zero to many blank characters. Lastly, a value for the keyword is specified. Keyword and value assignments preferably do not span multiple lines.

Comments in the threshold file preferably begin with a "#" or ";" as their first non-blank text. Keyword lines preferably do not contain comments. Comments and blank lines are preferably ignored. Note that comments that an administrator may make manually in a file may be overwritten or moved by the account manager.

Quotation marks in a value typically are not parsed to treat an entire value between the quotation marks as a single value. For example, the value, "This file", is treated as two values: (1) "This and (2) file.

Invalid lines are preferably ignored, such as a line having an invalid keyword name or no value at all. If a threshold rule does not have all its required values, the entire threshold rule preferably is ignored.

Threshold rules that are not valid are preferably ignored. When the account manager plug-in is initialized, it will log threshold rules that were valid and rules that were not valid along with their error. These threshold log summary records are stored in a AccountManagerLoadSummaryFile file name defined in the account manager configuration file. If the AccountManagerLoadSummaryFile is not specified in the account manager configuration file, the results of the account manager's loading of the threshold rules preferably are not logged.

Inside a threshold rule section, if a keyword and value pair is specified more than once, the last valid keyword and value pair in the rule will be used.

In the preferred embodiment, the order of threshold rules in the file may control processing. For example, the first one encountered for the monitored resource that matches the comparison will have its action executed. The remaining threshold rules may not be checked if one has already been triggered. However, the administrator can specify the threshold match keyword in the configuration file to trigger all matching threshold rules, and not just the first matching rule.

Preferably, a threshold rule cannot have the same title within the same monitored resource rule set. For example, two threshold rules with the same title preferably cannot have the same trigger-value, such as urlcounter. The two threshold rules could have the same title and have different trigger-values. Although allowed under these circumstances, the administrator is advised to keep the titles of each rule unique to reduce confusion.

If the account manager cannot access the log file specified in a threshold rule for reading or writing, usually no log record will be written, but the account manager will still initiate the action, if any, defined for the threshold rule.

If urlpath and/or dceusername values are specified, the threshold rule preferably must meet the conditions imposed by the triggervalue, urlpath, and dceusername in order to be triggered.

Sample Threshold File

The following is a sample threshold file.

```
# This is a sample threshold file - /usr/dfsweb/account/threshold

# Send a note to the administrator when the sensitive
# web page is accessed and log the action in the
# /usr/dfsweb/account/log/triggered_rules file.
# Note that the "http:/ is not included as part of the urlpath value.

[Sensitive Web Page - /... /sensitive.html]
trigger = urlcounter
triggercomparison = >
triggervalue = 0
urlpath = /.../sensitive.html
action = note
actionparameter = webadministrator@austin.com
logfile = /usr/dfsweb/account/log/triggered_rules

# Log a record in /usr/dfsweb/log/advertising whenever a URL that
# begins with /dfs/advertising/ is accessed. Note the ".*". not "*"
# indicates that one or more of any character may follow
# "/dfs/advertising/".

[Log access to /dfs/advertising/.*]
trigger = pagecounter
triggercomparison = >
triggervalue = 0
urlpath = /dfs/advertising/.*
action = none
logfile = /usr/dfsweb/log/advertising

# Run a popup program if 1000000 bytes or more are
# accessed by a user before the counter is reset.
# Also log the action in the
# /usr/dfsweb/account/log/triggered_rules file.

[Alert popup for accounts accessing one million bytes or more]
trigger = bytecounter
triggercomparison = > =
triggervalue = 1000000
action = program
actionparameter = /usr/bin/alert_popup.sh
logfile = /usr/dfsweb/account/log/triggered_rules

# Log a record in /usr/dfs/web/log/pagehogs if a user with a
# dceusername of bob or bill accesses more than 500 pages before the
# counter is reset.

[Log users accessing more than 500 pages]
trigger = pagecounter
triggercomparison = >
triggervalue = 500
dceusername = bob bill
action = none
logfile = /usr/dfsweb/log/pagehogs

# Run a paging program if a user has 10 or more failed login attempts.
#[Run paging program if 10 or more failed logins]
trigger = failedlogincounter
triggercomparison = > =
triggervalue = 10
action = program
actionparameter = /usr/bin/pager 555-1212
```

As noted above, preferably the account manager derives values for its monitored resources through the name/value pairs passed to it by the web server. Also, the server will communicate login information to the Account Manager through this same name/value structure.

Figure 5:
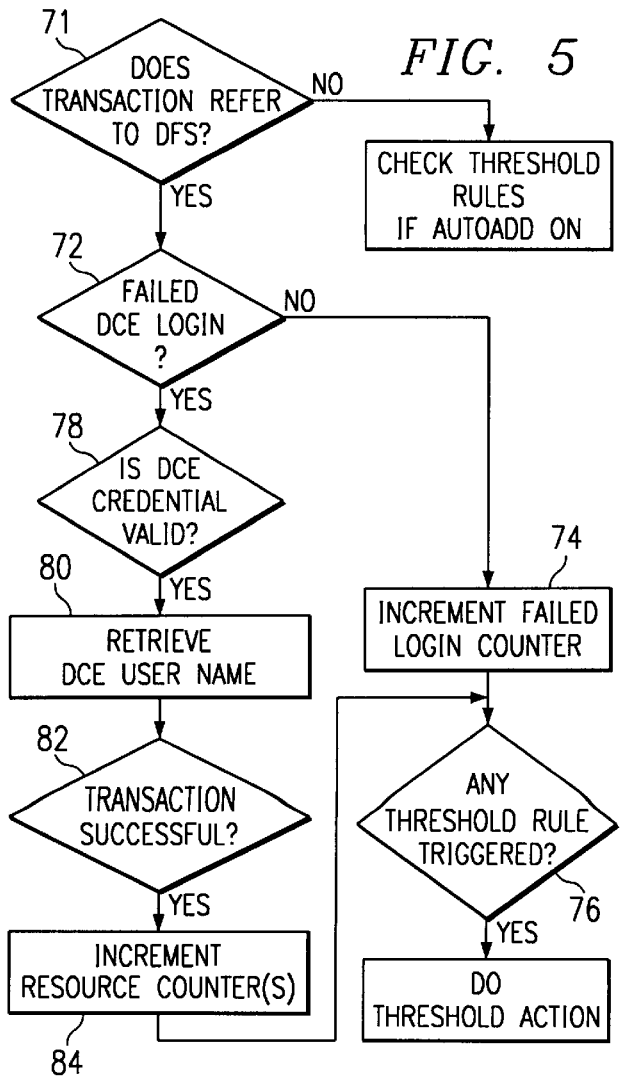
FIG. 5 is a flowchart illustrating steps followed to determine whether or not a resource should be monitored and threshold rules triggered.

The flowchart shown in FIG. 5 illustrates the steps followed to determine whether or not a resource should be monitored and threshold rules triggered. At step 71, a test is made to determine whether the transaction refers to the distributed file system (DFS). This will be the case is the following name and value pairs are true:

rq→reqpb: name="path" value=(starts with "/. . . ", "/.:" or "/:")

If the outcome of the test at step 71 is negative, the database counter value may still be updated and threshold rules checked if the autoadd value is set to "on" for the corresponding managed resource. At step 72, assuming the outcome of the test at step 71 was positive, a test is made to determine if the transaction is a failed DCE login. If the following name and value pairs are not true, the DCE login is successful:

rq→srvhdrs: name="status" value="401 Unauthorized" (just check for "401" at front)

rq→vars: name="DCE-VALID" value="−1"

If the above name and value pairs were true, indicating a negative outcome of the test at step 72, the routine increments the failed login counter for the user at 74 if the failed login counter is being monitored, checks at step 76 to see if any threshold rules have been triggered, and returns successfully. The DCE user name can be determined from the following name and value pair.

rq→vars: name="DCE-NAME" value=(user-name).

If the outcome of the test at step 72 was positive, the routine continues at step 78 to determine if the DCE credential is valid. (Note that for performance reasons the failed logon counter for the auth-user will not be reset if a transaction is valid. Preferably, a failed login record can only be reset manually by the administrator or automatically through the Resetinterval DCE Web configuration value.) If the following name and value pair is true, the DCE login is valid.

rq→vars: name="DCE-VALID" value="1"

At step 80, the DCE user name is retrieved from the following name and value pair:

rq→vars: name="auth-user" value=(DCE user name)

(It should be noted that the "auth-user" name is different from the "DCE-NAME" name. "DCE-NAME" is only available if the DCE login failed).

At step 82, a test is made to determine whether the transaction was successful, which is indicated by any of the following name and value pairs, for example:

rq→srvhdrs: name="status" value="200 OK"(just check for "200" at front)

rq→srvhdrs: name="status" value="304 Use local copy" (just check for "304" at front)

rq→srvhdrs: name="status" value="302 Found" (just check for "302" at front)

If any of the above name and value pairs were true, the routine continues at step 84 to increment the appropriate counters for the resource if the resource is being monitored, checks at step 86 to see if any threshold rules have been triggered, and returns successfully. The monitored values can be determined from the following name and value pairs.

| | | |
|---|---|---|
| rq—>reqpb: | name="path" | value=(path name) |
| rq—>vars: | name="auth-user" | value=(DCE user name) |
| rq—>srvhdrs: | name="content-length" | value=(page size in bytes) |

Note that the "auth-user" value is never normalized to the full DCE account name. Whatever is passed to the Account Manager will be stored in the database. The routine then returns to complete the name/value pair processing.

DFS Web Configuration File

Preferably, the account manager includes or has associated therewith a configuration file (called DFS Web configuration file) that stores startup values read in by the account manager when the plug-in is loaded or reloaded by the server. The fully-qualified file name to the configuration is passed in as a name-value parameter to the account manager when it is initialized by the Web server. Preferably, loaded configuration values must be valid, otherwise no resources will be monitored and thus no threshold rules can be triggered. To determine if a DFS Web configuration file is valid, the administrator must examine the load summary file after starting the server or the routine stdout when starting the server.

Account Manager Configuration Format

The format of the Account Manager section of the DFS Web configuration file is defined as follows:
[AccountManager]
ThresholdSourceFile=filename
ThresholdMatch={first|all}
AccountManagerLoadSummaryFile=filename
Resetinterval=interval-seconds
URLCounterDatabase={file|dbm|none}
URLCounterAutoAdd={on|off}
URLCounterReset={never|interval}
URLCounterFile=filename
PageCounterDatabase={file|dbm|none}
PageCounterAutoAdd={on|off}
PageCounterReset={never|interval}
PageCounterFile=filename
ByteCounterDatabase={file|dbm|none}
ByteCounterAutoAdd={on|off}
ByteCounterReset={never|interval}
ByteCounterFile=filename
FailedLoginCounterDatabase={file|dbm|none}
FailedLoginCounterAutoAdd={on|off}
FailedLoginCounterReset={never|interval}
FailedLoginCounterFile=filename Each of the monitored resources are represented in the DFS Web configuration file: URLCounter, PageCounter, ByteCounter, and FailedLoginCounter. The specific parameters to each resource are defined as follows:

Database—{file|dbm|none}

The options correspond to the storage of records relating to the resource via ASCII file storage, storage through the dbm interface, or no storage at all. If "none" is specified, the resource will not be monitored. This is equivalent to not including the monitored resource keyword group in the configuration file.

The default is none.

AutoAdd—{on|off}

Tells the account manager whether or not to automatically add records to the corresponding monitored resource database if the user has not logged onto DCE through the session manager. The account manager will search for the DCE-VALID keyword in its parameter block. If the DCE-VALID keyword exists and its value is 1, the account manager will assume that the user has successfully logged onto DCE.

Turning AutoAdd on will log all user actions, whether or not the user has successfully logged into DCE yet.

The default is off.

CounterReset—{never|interval}

If "never" is specified, the administrator must manually reset the counter for an individual record or the counters for all the records of the managed resource. This can be done, for example, through an administrative web page.

If "interval" is specified, the counter for the records belonging to the managed resource will be reset to 0 when a transaction on the managed resource occurs and the current time has passed the last reset time for the record plus the ResetInterval, which is specified in seconds.

The default is never.

File-fully-qualified file name to the ASCII file or dbm where the records for the corresponding managed resource are stored.

The directory must already exist and be readable and writable by the uid and gid under which the web server is running.|f the file exists, it must be readable and writable by the uid and gid under which the web server is running.

This keyword does not have a default. If it is not specified, the resource will not be monitored. If the account manager cannot access the specified file for reading or writing, the resource will not be monitored.

If the Database keyword value is not set to none and a File keyword value is not specified, the entire configuration is invalid.

The Database and File keywords for a monitored resource must be specified or the resource will not be monitored.

The file names for each defined monitored resource must be different. if any of the database file names are the same, the entire configuration is invalid.

The remaining account manager keywords are defined as follows:

ThresholdSourceFile-fully-qualified file name to the threshold rules definition file.

The file must already exist and be readable by the uid and gid under which the web server is running. The default is not to have a threshold file and thus no threshold rules.

If the threshold source file is specified, but cannot be loaded, the entire configuration is invalid. If the threshold source and load summary files have the same file names, the entire configuration is invalid.

ThresholdMatch—{first|all}.

When a Web transaction occurs, the value of this keyword indicates if only the first matching threshold rule should be triggered or if all matching threshold rules should be triggered. As mentioned in the threshold rules description, only thresholds belonging to resources that are actively monitored are checked. The threshold rules are checked in the order that they were loaded from the threshold rules file.

If the value is "all" the administrator can define multiple rules for a monitored resource with the same triggercomparison and trigger value. Once the threshold condition was met, all the matching threshold rules would be triggered in the order they were loaded from the threshold file. If the administrator defined multiple rules for a monitored resource with the same triggercomparison and trigger value and the ThresholdMatch keyword was set to "first," only the first matching threshold rule would be triggered.

- The default is "first." If the value for the keyword is invalid in the configuration file, it will be set to "first."
- AccountManagerLoadSummaryFile-fully-qualified file name to the file where the results of the account manager's loading of the threshold file will be stored. This file will also contain a list of the monitored resources.
- If this file already exists, additional log records will be appended to it. This file must be readable and writable by the uid and gid under which the web server is running. The default is not to log the results of the account manager's loading of the configuration and threshold files.
- If the account manager cannot read a specified AccountManagerLoadSummaryFile it will log an error to stdout and the web server log. Whether or not the Account Manager logs records to an AccountManagerLoadSummaryFile, it will log the same information to stdout.
- ResetInterval-rest time in seconds.
- This keyword is used by monitored resources to determine when to set their record counters back to 0 if their *CounterReset keyword is set to "interval". Valid values are between 0 and 2678400 (31 days). The default is 0, which equates to not resetting the value.
- A reset for a database record based on the ResetInterval value will not trigger any threshold rules.

Additional DFS Web Configuration File Format Rules

All string values in a configuration file are case sensitive. For the account manager section, all file names are string values and are thus case sensitive.

The following value must be specified as an integer between 0 and 2678400 (31 days):
interval-seconds Keywords in the configuration file are not case sensitive. The keywords supported are:
AccountManagerLoadSummaryFile
ThresholdSourceFile
ThresholdMatch
Resetinterval
URLCounterDatabase
URLCounterAutoAdd
URLCounterReset
URLCounterFile
PageCounterDatabase
PageCounterAutoAdd
PageCounterReset
PageCounterFile
ByteCounterDatabase
ByteCounterAutoAdd
ByteCounterReset
ByteCounterFile
FailedLoginCounterDatabase
FailedLoginCounterAutoAdd
FailedLoginCounterReset
FailedLoginCounterFile As Database values, the following keywords are not case sensitive:
file
dbm
none As AutoAdd values, the following keywords are not case sensitive:
on
off As Reset values, the following keywords are not case sensitive:
never
interval The following describes some additional features of a preferred exemplary embodiment although again it should be appreciated that the following should not be taken to limit the present invention.

Even though the account manager can default all its values, the "[Account manager]" section is typically present in the configuration file. If not, the file is not considered a valid configuration file.

All keywords in the configuration file are preferably unique. For example, a non-account manager section preferably cannot have a Resetinterval keyword since the account manager section already uses it.

Each keyword can be preceded by zero to many blank characters. The keyword can be followed by zero to many blank characters. An equal sign preferably must come afterwards followed by zero to many blank characters. Lastly, a value for the keyword preferably must be specified.

Preferably, keyword and value assignments do not span multiple lines.

Comments in the threshold file preferably begin with a "#" or ";" as their first non-blanket text. Preferably, keyword lines do not contain comments. Comments and blank lines are preferably ignored. Note that comments that an administrator may make manually in a file may be overwritten or moved by the account manager.

Quotation marks in a value typically are not parsed to treat an entire value between the quotation marks as a single value. For example, the value, "This file", is treated as two values: (1) "This and (2) file". Invalid lines are preferably ignored.

Monitored resource rules that are not valid are preferably ignored. When the account manager plug-in is initialized, it will print to stdout the account manager configuration keywords that were valid and those that were not. This information will also be stored in the AccountManagerLoadSummaryFile file name, if defined in the configuration file. If the account manager cannot access the file for writing, the results of the account manager's loading of the configuration file typically will not be recorded.

Inside the account manager section of the configuration file, if a keyword and value pair is specified more than once, the last valid keyword and value pair in the rule typically will be used.

If more than one account manager section is defined in a configuration file, preferably only the values for the first section will be used. All subsequent redefinitions of the account manager section in the configuration file preferably will be ignored.

Installation and Configuration of the Account Manager Plug-in

To install the account manager plug-in, an Installation and Configuration program will need to modify the workstation web server configuration file as well as install the DFS Web configuration and threshold files on the target workstation.

Configuration of Netscape

To use the account manager plug-in with a Netscape web server, the installation and configuration program of the product will need to include the following lines in the initial portion of the Netscape server obj.conf file:

```
Init fn="load-modules" shlib="/usr/lib/libdfswebamgr.a"
func="dwbamgr-init,dwbamgr-log
Init fn=dwbamgr-init" cfgfile="/usr/dfsweb/dfsweb.cfg"
```

The first line indicates that the account manager shared library, /usr/lib/libdfswebamgr.a, should be loaded upon server startup and that the dwbamgr-init and dwbamgr-log functions in the shared library should be externalized. Note that the shared library path is fully-qualified.

The second line indicates that the dwbamgr-init function should be called when the server is started and that the cfgfile keyword and value should be passed in. The value for the cfgfile should be the fully-qualified path to the DFS Web configuration file.

The installation and configuration program of the product will also need to include the following line in the <object> section of the Netscape server obj.conf file:
AddLog fn="dwbamgr-log"
The Add Log line indicates that the dwbamgr-log function should be called when a Netscape web transaction reaches the AddLog stage.

If there are any problems with the syntax of the DFS Web configuration file or Threshold file, the lines read in by the Account Manager and the errors associated with the invalid lines will be logged to the AccountManagerLoadSummaryFile. The Account Manager will also store the results of validating the DFS Web configuration file and Threshold file in the AccountManagerLoadSummaryFile.

If the DFS Web configuration file cannot be found or read, the Account Manager will log an error to stdout and the web server log file. If the AccountManagerLoadSummaryFile file cannot be found or read, the Account Manager will log an error to the web server log file. Note that if the web server has not yet read in its value for its log file during the web server initialization process, the web server will send the log message to stdout instead.

Configuration of DFS Web Configuration and Threshold Files

The installation and configuration program for the product will need to ask the administrator a number questions in order to create the DFS Web configuration file and threshold file.

The Account Manager portion of the DFS Web product directory defaults to /usr/lpp/dfsweb/etc/<servername>. This directory is abbreviated to $DFSWEB. <servername> is the name of the web server into which the DFS Web product is being installed and configured.

The configuration file will be stored in $DFSWEB/dfsweb.cfg. The configuration file is required for the account manager plug-in even if the administrator does not want to monitor any resources.

The threshold file will be stored in $DFSWEB/dfsweb.thr. The administrator can add additional rules either manually or through the DFS Web Administrator graphical user interface at a later time. This template threshold rule file helps establish the threshold file with the web server for future additions.

Configuration File Template

To fill out the values in the configuration file template and install the file on the administrator's workstation, the installation and configuration program for the product will need to ask the administrator for responses to prompts, such as the following:

What is the fully-qualified file name of the Account Manager Load Summary File? (Options: nil or fully-qualified file name) (default $DFSWEB/loadsummary)

What is the reset interval in seconds for counters of monitored resources? (range: 0-2678400) (default 0)

Monitor the URLCounter?

If yes, what is the fully qualified database file name? (required) (default $DFSWEB/dburl)

If yes, should non-DFS Web transactions be monitored? (options: on off) (default off)

1. Set the URLCounterDatabase value to dbm.
2. If the reset interval is not 0, set the URLCounterAutoAdd value to interval.
3. If the reset interval is 0, set the URLCounterAutoAdd value to never.

If no, set the Database value to none.

The previous question is also asked for the other monitored resources.

Responses to the prompts will be used to fill out the ??? marks in the following template configuration file. Note that the $DFSWEB in the template file will be expanded to the fully-qualified path to the DFS Web product directory.
Install/Config DFS Web Configuration File Template
DFS Web Product—$DFSWEB/dfsweb.cfg
You can edit this file, but comments and formatting changes
might be lost when the DFS Web product makes changes.
[AccountManager]
AccountManagerLoadSummaryFile=???
ThresholdSourceFile=$DFSWEB/dfsweb.thr
ThresholdMatch=???
ResetInterval=???
URLCounterDatabase=???
URLCounterAutoAdd=???
URLCounterReset=???
URLCounterFile=???
PageCounterDatabase=???
PageCounterAutoAdd=???
PageCounterReset=???
PageCounterFile=???
PageCounterDatabase=???
PageCounterAutoAdd=???
PageCounterReset=???
PageCounterFile=???
ByteCounterDatabase=???
ByteCounterAutoAdd=???
ByteCounterReset=???
ByteCounterFile=???
FailedLoginCounterDatabase=???
FailedLoginCounterAutoAdd=???
FailedLoginCounterReset=???
FailedLoginCounterFile=???
Sample DFS Web Configuration File
  The following is a sample DFS Web configuration file:
Install/Config DFS Web Configuration File
DFS Web Product-/usr/lpp/dfsweb/etc/graywolf/dfsweb.cfg
You can edit this file, but comments and formatting changes
might be lost when the DFS Web product makes changes.
[Account Manager]
ThresholdSourceFile=/usr/lpp/dfsweb/etc/graywolf/dfsweb.thr ThresholdSourceFile=/usr/lpp/dfsweb/etc/graywolf/dfsweb.thr
ThresholdMatch=first
AccountManagerLoadsummaryfile=/usr/lpp/dfsweb/etc/graywolf/loadsummary
URLCounterDatabase-dbm
URLCounterAutoAdd=on
URLCounterReset=never
URLCounterFile=/usr/lpp/dfsweb/etc/graywolf/dburl
PageCounterDatabase=dbm
PageCounterAutoAdd=on
PageCounterReset=never
PageCounterFile=/usr/lpp/dfsweb/etc/graywolf/dbpage
ByteCounterDatabase-dbm
ByteCounterAutoAdd=on
ByteCounterReset=never
ByteCounterFile=/usr/lpp/dfsweb/etc/graywolf/dbbyte
FailedLoginCounterDatabase=dbm
FailedLoginCounterAutoAdd=on
FailedLoginCounterReset=never
FailedLoginCounterFile=/usr/lpp/dfsweb/etc/graywolf/dbfailed Threshold File Template To fill out the values in the threshold file template and install the file on the administrator's workstation, the installation and configuration program for the DFS Web product will ask the administrator for responses to prompts, such as the following:

What action should be taken if there are too many failed logins?(options: none, counter, program, note) (default none)

If the action is none, the trigger value should be 10. Remaining variable values will be set to nil.

If the action is not none, what should the trigger value be for the number of failed logins? (range: 0-MAX_INT) (default 10)

If the action is not none, what fully-qualified log file name should be used to record failed login attempts? (default nil)

If the action is clear, set the action parameter to nil.

If the action is program, what program should be run with what parameters? (required)

If the action is note, what email address should mail be sent to with what text? (required)

Whatever the action, what fully-qualified log file name should store records of this triggered threshold? (options: nil or fully-qualified file name) (default $DFSWEB/thresholdlog)

Responses to the prompts will be used to fill out the ??? marks in the following template threshold file. Note that the $DFSWEB in the template file will be expanded to the fully-qualified path to the DFS Web product directory.

```
# Install/Config DFS Web Threshold File Template
# DFS Web Product-$DFSWEB/dfsweb.thr
# You can edit this file, but comments and formatting changes
might be lost when the DFS Web product makes changes.
[Too many failed logins]
trigger=failedlogincounter
triggercomparison=>
triggervalue=???
action=???
actionparameter=???
logfile=???
```

Sample Load Summary File

The following is a sample load summary file. The file shows the lines read in from the configuration and threshold files and how the Account Manager processes them.

```
******************************************
***     Reading DFS Web Configuration file
"/usr/lpp/dfsweb/etc/graywolf/dfsweb.cfg"
******************************************
> #     Install/Config DFS Web Configuration File Template
> #     DFS Web Product - /usr/lpp/dfsweb/etc/graywolf/dfsweb.cfg
> #     You can edit this file, but comments and formatting changes
> #     might be lost when the DFS Web product makes changes.
>
>
>       [Account Manager]
>
>       AccountManagerLoadSummaryFile =
/usr/lpp/dfsweb/etc/graywolf/loadsummary
        Keyword = "AccountManagerLoadSummaryFile", Value =
"/usr/lpp/dfsweb/etc/graywolf
>       ThresholdSourceFile = /usr/lpp/dfsweb/etc/graywolf/dfsweb.thr
        Keyword = "ThresholdSourceFile", Value =
"/usr/lpp/dfsweb/etc/graywolf/dfsweb.
>       ThresholdMatch = first
        Keyword = "ThresholdMatch", Value = "first"
>       ResetInterval = 0
        Keyword = "ResetInterval", Value = "0"
>
>       URLCounterDatabase = dbm
        Keyword = "URLCounterDatabase", Value = "dbm"
>       URLCounterAutoAdd = 0
        Keyword = "URLCounterAutoAdd", Value = "on"
>       URLCounterReset = never
        Keyword = "URLCounterReset", Value = "never"
>       URLCounterFile = /usr/lpp/dfsweb/etc/graywolf/dburl
        Keyword = "URLCounterFile", Value =
"/usr/lpp/dfsweb/etc/graywolf/dburl"
>
>       PageCounterDatabase = dbm
        Keyword = "PageCounterDatabase", Value = "dbm"
>       PageCounterAutoAdd = on
```

-continued

```
        Keyword = "PageCounterAutoAdd", Value = "on"
>       PageCounterReset = never
        Keyword = "PageCounterReset", Value = "never"
>       PageCounterFile = /usr/lpp/dfsweb/etc/graywolf/dbpage
        Keyword = "PageCounterFile", Value =
"/usr/lpp/dfsweb/etc/graywolf/dbpage"
>
>       ByteCounterDatabase = dbm
        Keyword = "ByteCounterDatabase", Value = dbm"
>       ByteCounterAutoAdd = on
        Keyword = "ByteCounterAutoAdd", Value = "on"
>       ByteCounterReset = never
        Keyword = "ByteCounterReset", Value = "never"
>       ByteCounterFile = /usr/lpp/dfsweb/etc/graywolf/dbbyte
        Keyword = "ByteCounterFile", Value =
"/usr/lpp/dfsweb/etc/graywolf/dbbyte"
>
>       FailedLoginCounterDatabase = dbm
        Keyword "FailedLoginCounterDatabase", Value =dbm"
>       FailedLoginCounterAutoAdd = on
        Keyword = "FailedLoginCounterAutoAdd", Value = "on"
>       FailedLoginCounterReset = never
        Keyword = "FailedLoginCounterReset", Value = "never"
>       FailedLoginCounterFile = /usr/lpp/dfsweb/etc/graywolf/dbfailed
        Keyword = "FailedLoginCounterFile", Value =
"/usr/lpp/dfsweb/etc/graywolf/dbfailed"
>
*****************************************
***     Reading DFS Web Threshold File
/usr/lpp/dfsweb/etc/graywolf/dfsweb.thr
*****************************************
>> #    Install/Config DFS Web Threshold File Template
>> #    DFS Web Product - /usr/lpp/dfsweb/etc/graywolf/dfsweb.thr
>> #    You can edit this file, but comments and formatting changes
>> #    might be lost when the DFS Web product makes changes.
>> #
>>      [Too many failed logins]
>>      trigger = failedlogincounter
        keyword = "trigger", value = "failedlogincounter"
>>      triggercomparison = =
>>      keyword = "triggercomparison", value = "="
>>      triggervalue = 10
        keyword = "triggervalue, value = "10"
>>      action = note
        keyword = "action", value = "note"
>>      actionparameter = shrader@austin.ibm.com 1 2 3
>>      keyword = "actionparameter", value = "shrader@austin.ibm.com 1 2
3"
>>      logfile = ?user/lpp/dfsweb/etc/graywolf/triggerlog
        keyword = "logfile", value = "/usr/lpp/dfsweb/etc/graywolf/triggerlog"
>>
>>      [Reset counter after too many failed logins]
*****************************************
***     Validating Threshold Rule [Too many failed logins]
*****************************************
WARNING: Count not obtain information on the Logfile
"/usr/lpp/dfsweb/etc/graywolf/trigger
        File "/usr/lpp/dfsweb/etc/graywolf/triggerlog" may not exist yet.
***     Validation for threshold rule [Too many failed logins] at the end of the
failed logincounter rule set
>>      trigger = failedlogincounter
        keyword = "trigger", value = "failedlogincounter"
>>      triggercomparison = >
        keyword = "triggercomparison", value = ">"
>>      triggervalue = 10
        keyword = "triggervalue", value = "10"
>>      action = clear
        keyword = "action", value = "clear"
>>      logfile = /usr/lpp/dfsweb/etc/graywolf/triggerlog
        keyword = "logfile", value = "/usr/lpp/dfsweb/etc/graywolf/triggerlog"
*****************************************
***     Validating Threshold Rule [Reset counter after too many failed logins]
*****************************************
WARNING: Could not obtain information on the Logfile
"usr/lpp/dfsweb/etc/graywolf/trigger
        File "/usr/lpp/dfsweb/etc/graywolf/triggerlog: may not exist yet.
***     Validation for threshold rule [Reset counter after too many failed logins]
added at end of failed login
*****************************************
```

```
-continued

***   Added threshold rule id 2 with name [Reset counter after too many
failed logins]
******************************************
******************************************
***   Validating DFS Web Configuration File
******************************************
***   Validation of DFS Web configuration file ended with 0 errors and 0
warnings.
******************************************
***   DFS Web Configuration File Values
******************************************
The configuration file passed validation.
Configuration file name = /usr/lpp/dfsweb/etc/graywolf/dfsweb.cfg
Configuration file last modified time = Thu Nov 14 18:30:15 1996
Load summary file name = /usr/lpp/dfsweb/etc/graywolf/loadsummary
Reset interval = 0 seconds (no automatic reset performed)
+++ Thresholds active +++
Number of thresholds rules = 2
Only the first matching threshold triggered.
Threshold file name = /usr/lpp/dfsweb/etc/graywolf/dfsweb.thr
Threshold file last modified time = Thu Nov 14 15:31:19 1996
**      UrlCounter Values ** MONITORED
        Database = dbm
        AutoAdd = on
        Reset = never
        Database file name = /usr/lpp/dfsweb/etc/graywolf/dburl
**      PageCounter Values ** MONITORED
        Database = dbm
        AutoAdd = on
        Reset = never
        Database file name = /usr/lpp/dfsweb/etc/graywolf/dbpage
**      ByteCounter Values ** MONITORED
        Database = dbm
        AutoAdd = on
        Reset = never
        Database file name = /usr/lpp/dfsweb/etc/graywolf/dbbyte
**      FailedLoginCounter Values ** MONITORED
        Database = dbm
        Autoadd = on
        Reset = never
        Database file name = /usr/lpp/dfsweb/etc/graywolf/dbfailed
***   The DFS Web Configuration file
"/usr/lpp/dfsweb/etc/graywolf/dfsweb.cfg" passed validation.
***   URLCounterDatabase monitored in file
"/usr/lpp/dfsweb/etc/graywolf/dburl". **
***   PageCounterDatabase monitored in file
"/usr/lpp/dfsweb/etc/graywolf/dbpage".
***   ByteCounterDatabase monitored in file
"/usr/lpp/dfsweb/etc/graywolf/dbbyte".
***   FailedLoginCounterDatabase monitored in file
      "/usr/lpp/dfsweb/etc/graywolf/dbfailed
***   The DFS Web threshold file is
"/usr/lpp/dfsweb/etc/graywolf/dfsweb.thr". ***
***   Transactions will be monitored against 2 threshold rules. ***
```

One of the preferred implementations of the account manager of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via a computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific distributed file system environment, those skilled in the art will recognize that the invention can be practiced, with modification, in other and different hardware and operating system architectures with the spirit and scope of the appended claims. Moreover, implementation in OSF DCE is not a requirement of the present invention either.

Additional variations and modifications of the account manager operations are also within the scope of this invention. Thus, for example, the account manager may support a configuration option that allows the triggering of all threshold rules that match a web transaction, not just the first one that matches. In addition, the account manager GUI may provide web administration pages for the viewing of database records, administration of database records, and definition of threshold actions. The account manager may provide support for predefined substitutions in the parameter value of threshold rules (e.g., % dceusername, % date, % yr1), provide support for the threshold actions of enabling and disabling registry accounts, provide a command line interface for monitored resource database query and resetting, support ASCII files as a database medium, support a dcegroupname filter as part of a threshold rule definition, store the client ip address with the dce user name for a failed login record, support the preservation of comments throughout the threshold and configuration files, and support the definition of threshold rules that can be triggered on server errors.

Of course, it may also be desirable to add additional monitored resources, add additional database mediums (such as SQL, DFS or the DCE registry) for supporting the resource information, provide support for compound monitored thresholds (e.g. dceusername=fred && bytecounter>10000), add additional threshold actions (such as SNMP traps), and the like. All of these variations and modifications are deemed to be within the scope of the present invention.

Having thus described our invention, what we claim as new and desire to secure by Letters Patent is set forth in the following claims:

1. A monitoring system for a Web server having an application programming interface (API), comprising:
    a plug-in communicating with the Web server, the plug-in receiving operational parameter data from the Web server, the plug-in comprising:
        a list of a set of one or more resources to be monitored;
        a threshold rule for at least one of the set of monitored resources;
        a transaction monitor responsive to Web transactions at the Web server, the transaction monitor storing information on transactions affecting one or more of the set of monitored resources; and
        a threshold monitor responsive to the transaction monitor, the threshold monitor triggering one of a set of threshold actions in response to the at least one of the set of monitored resources exceeding the threshold rule.

2. The monitoring system as described in claim 1 wherein the set of one or more monitored resources includes a resource selected from the group consisting of: a number of times a URL location is accessed, a number of bytes a user has accessed, a number of operations a user has initiated, and a number of times a user has a failed login.

3. The monitoring system as described in claim 1 wherein the information on a monitored resource is stored by the transaction monitor in a database having a column format.

4. The monitoring system as described in claim 1 further including a threshold definition file in which threshold rules are stored.

5. The monitoring system as described in claim 1 wherein the set of threshold actions include an action selected from the group consisting of: clearing a record counter, running a given program, sending an e-mail note, disabling a user account, and enabling a user account.

6. The monitoring system as described in claim 1 wherein the threshold monitor logs the threshold action triggered.

7. The monitoring system as described in claim 1 wherein the condition of the threshold rule is evaluated after a database record for a monitored resource is updated.

8. A computer program product in a computer-readable medium for use in a Web server for administration and management of server transactions, comprising:
    a plug-in communicating with the Web server, the plug-in receiving operational parameter data from the Web server, the plug-in comprising:
        a list of a set of one or more resources to be monitored;
        a threshold rule for at least one of the set of monitored resources;
        a transaction monitor responsive to Web transactions at the Web server, the transaction monitor storing information on transactions affecting one or more of the set of monitored resources; and
        a threshold monitor responsive to the transaction monitor, the threshold monitor triggering one of a set of threshold actions in response to the at least one of the set of monitored resources exceeding the threshold rule.

9. The computer program product as described in claim 8 wherein the set of monitored resources includes a resource selected from the group consisting of: a number of times a URL location is accessed, a number of bytes a user has accessed, a number of operations a user has initiated, and a number of times a user has a failed login.

10. The computer program product as described in claim 8 wherein the set of threshold actions include an action selected from the group consisting of: clearing a record counter, running a given program, sending an e-mail note, disabling a user account and enabling a user account.

11. A computer, comprising:
    a processor;
    an operating system;
    a Web server program having an application programming interface (API) for processing HTTP client requests; and an account manager plug-in to the API, the account manager plug-in receiving operational parameter data from the Web server, comprising:
        a list of a set of one or more resources to be monitored;
        a threshold rule for at least one of the set of monitored resources;
        a transaction monitor responsive to Web transactions at the Web server, the transaction monitor storing information on transactions affecting one or more of the set of monitored resources; and
        a threshold monitor responsive to the transaction monitor, the threshold monitor triggering one of a set of threshold actions in response to the at least one of the set of monitored resources exceeding the threshold rule.

12. The computer as described in claim 11 wherein the set of monitored resources includes a resource selected from the group consisting of: a number of times a URL location is accessed, a number of bytes a user has accessed, a number of operations a user has initiated, and a number of times a user has a failed login.

13. The computer as described in claim 11 wherein the set of threshold actions include an action selected from the group consisting of: clearing a record counter, running a given program, sending an e-mail note, disabling a user account and enabling a user account.

14. A method operative at a Web server in a stateless client-server environment for managing server transactions, comprising the steps of:
    initiating an account manager plug-in in communication with the Web server;
    establishing a set of one of more resources to be monitored;
    defining a threshold rule for at least one of the set of monitored resources;
    monitoring Web server transactions initiated from client machines to the Web server via the account manager plug-in and storing information on the set of one or more monitored resources; and
    responsive to the account manager plug-in detecting a monitored resource exceeding a condition of a threshold rule, triggering one of a set of threshold actions.

15. The method as described in claim 14 wherein the set of one or more monitored resources includes a resource selected from the group consisting of: a number of times a URL location is accessed, a number of bytes a user has accessed, a number of operations a user has initiated, and a number of times a user has a failed login.

16. The method as described in claim 14 wherein the set of threshold actions include an action selected from the group consisting of: clearing a record counter, running a given program, sending an e-mail note, disabling a user account and enabling a user account.

17. The method as described in claim 14 further including the step of logging the threshold actions triggered.

18. The method as described in claim 14 wherein the condition of the threshold rule is evaluated after a database record for a monitored resource is updated.

19. In a Web server connectable to a distributed computing environment having a distributed file system service and a security service for returning a credential to a user authenticated to access the distributed file system service, the improvement comprising:

a plug-in communicating with the Web server, the plug-in receiving operational parameter data from the Web server, the plug-in comprising:

a list of a set of one or more resources to be monitored;
   a threshold rule for at least one of the set of monitored resources;
   a transaction monitor responsive to Web transactions at the Web server, the transaction monitor storing information on transactions affecting one or more of the set of monitored resources; and
   a threshold monitor responsive to the transaction monitor, the threshold monitor triggering one of a set of threshold actions in response to the at least one of the set of monitored resources exceeding the threshold rule.

20. In the Web server as described in claim 19 further including:

means responsive to the monitored resource exceeding the condition of the threshold rule for logging the threshold action triggered.

* * * * *